United States Patent
Ishida et al.

(10) Patent No.: US 7,057,678 B2
(45) Date of Patent: Jun. 6, 2006

(54) LIQUID CRYSTAL DISPLAY DEVICE HAVING BACKLIGHT WITH RETURN SUBSTRATE ABOVE OR BELOW A PORTION OF LAMP TUBES

(75) Inventors: Hiroshi Ishida, Tokyo (JP); Tsutomu Kanatsu, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 40 days.

(21) Appl. No.: 10/123,653

(22) Filed: Apr. 16, 2002

(65) Prior Publication Data

US 2002/0149713 A1 Oct. 17, 2002

(30) Foreign Application Priority Data

Apr. 17, 2001 (JP) .............................. 2001-118572

(51) Int. Cl.
*G02F 1/1333* (2006.01)

(52) U.S. Cl. ...................... 349/58; 362/225; 361/681; 349/70

(58) Field of Classification Search ................. 349/58, 349/70; 361/681; 362/217, 225, 630, 631
See application file for complete search history.

(56) References Cited

U.S. PATENT DOCUMENTS

| | | | | | |
|---|---|---|---|---|---|
| 4,909,604 | A | * | 3/1990 | Kobayashi et al. | 349/64 |
| 4,950,053 | A | * | 8/1990 | Haim et al. | 349/70 |
| 5,375,005 | A | * | 12/1994 | Komano | 349/58 |
| 6,130,658 | A | * | 10/2000 | Yamamoto et al. | 345/102 |

FOREIGN PATENT DOCUMENTS

| | | |
|---|---|---|
| JP | 11-030775 | 2/1999 |
| JP | 2001-013496 | 1/2001 |

* cited by examiner

*Primary Examiner*—Andrew Schechter
*Assistant Examiner*—Michael H. Caley
(74) *Attorney, Agent, or Firm*—Hayes Soloway P.C.

(57) ABSTRACT

In a liquid crystal display device there are provided a liquid crystal panel, a chassis, a side reflector, an optical sheet, a diffuser, and a bottom reflector. In the side reflector are provided plural lamp support bases in a row in a direction parallel to the surface of the liquid crystal panel. The lamp support bases are arranged so as to hold low pressure-side end portions of lamps respectively. A return substrate extending in the arranged direction of the lamps is mounted to the lamp support bases on the side opposed to the liquid crystal panel. Further, lead wires are drawn out toward the return substrate from low pressure-side end portions of the lamps, then are allowed to pass through the lamp support bases and are connected to the return substrate. With this arrangement, it is possible to narrow a picture frame area.

16 Claims, 6 Drawing Sheets

LIQUID CRYSTAL DISPLAY DEVICE HAVING BACKLIGHT WITH RETURN SUBSTRATE ABOVE OR BELOW A PORTION OF LAMP TUBES

BACKGROUND OF THE INVENTION

1. Field of the Invention

The present invention relates to a liquid crystal display device provided with a direct backlight and more particularly to a liquid crystal display device able to narrow a picture frame and make the luminance of a liquid crystal panel uniform.

2. Description of the Related Art

Liquid crystal display devices are used to constitute a monitor in a thin TV receiver, a stand-alone type monitor, and a monitor in a notebook-size personal computer. A conventional liquid crystal display device is made up of a backlight, a liquid crystal panel which allows light projected from the backlight to pass therethrough selectively and form an image thereon, and a housing which houses therein the backlight and the liquid crystal panel. The types of backlights include an edge backlight wherein a light source such as a fluorescent lamp is disposed sideways of the housing and light is conducted to a liquid crystal panel by means of a light guide plate, and a direct backlight wherein a light source is disposed oppositely to a liquid crystal panel. The direct backlight, in comparison with the edge backlight, can improve the luminance of the liquid crystal panel and so is applied to a liquid crystal display device which constitutes, for example, a monitor in a high-definition type thin TV receiver.

The liquid crystal panel indicates a panel comprising a transparent substrate having switching elements such as TFTs (thin-film transistors) formed thereon, a transparent counter substrate opposed to the transparent substrate, and a liquid crystal sealed between the two substrates, with liquid crystal display device portions being disposed in a matrix form, and wherein drivers are connected respectively to a scanning line and a signal line both provided in each of the liquid crystal display device portions and a connecting substrate is connected to each of the drivers. The backlight comprises a light source such as a fluorescent lamp, a holder for holding the light source, and a diffuser for diffusing light emitted from the light source.

FIG. 1 is a partial sectional view showing the construction of a conventional liquid crystal display device. As shown in the same figure, the conventional liquid crystal display device is provided with a liquid crystal panel 22 for the display of image and a frame 21 of an L-shaped section, the frame 21 supporting the liquid crystal panel 22 while covering side portions of a surface of the liquid crystal panel 22 and constituting side portions of the whole of the liquid crystal display device. A frame-like cushion 38 is connected to the liquid crystal panel 22 and a chassis 23 is connected to the cushion 38. The cushion 38 is for preventing a glass substrate of the liquid crystal panel 22 from being damaged by contact thereof with the chassis 23. A side reflector 24 is connected to the chassis 23. The side reflector 24 supports a side portion of a diffuser 25 at an end portion thereof close to the liquid crystal panel 22. The diffuser 25 is a translucent plate of white color made of an acrylic resin for example and is disposed in parallel with the liquid crystal panel 22.

A single side reflector 24 is provided with plural lamp support bases 26 which are arranged in a row in a direction parallel to a surface of the liquid crystal panel 22. Each lamp support base 26 holds a low pressure-side end portion 27a of a lamp 27 which is a cold-cathode discharge tube. Plural lamps 27 are provided and are arranged in parallel. A return substrate 28 which extends in the arranged direction of the lamps 27 is attached to end portions of the lamp support bases 26 on the side opposite to the arranged side of the lamps 27. Lead wires 29 are drawn out axially of the lamps 27 from the low pressure-side end portions 27a of the lamps 27, then pass through the lamp support bases 26, reach the return substrate 28 and are connected to the return substrate 28 by solder 28b formed on a surface 28a of the return substrate 28. The surface 28a is perpendicular to a display surface of the liquid crystal panel 22. The return substrate 28 interconnects the lead wires 29 which are connected to the low pressure-side end portions 27a of the lamps 27.

A single cable (not shown) is connected at one end thereof to the return substrate 28 and is also connected at an opposite end thereof to an inverter substrate (not shown), which inverter substrate is connected to high pressure-side end portions (not shown) of the lamps 27. For preventing contact of the return substrate 28 with the frame 21, which would cause a short, there is formed a gap 31 between the return substrate 28 and the frame 21 and an insulating sheet 32 is attached to an inner surface of the frame 21. Further, a bottom reflector 30 is provided in an opposed relation to the diffuser 25 with the lamps 27 therebetween. The bottom reflector 30 is for reflecting light from the lamps 27 toward the liquid crystal panel 22.

Ineffective light emitting portions 27b are provided respectively at both end portions of each lamp 27 which is a cold-cathode discharge tube. The portion between the ineffective light emitting portions 27b at both ends is an effective light emitting portion 27c. The ineffective light emitting portions 27b of each lamp 27 are portions of a cold-cathode discharge tube within which are disposed electrodes (not shown). The ineffective light emitting portions 27b also emit light, but the emitted light is weak and not uniform. The length of each ineffective light emitting portion 27b is usually about 7 mm although it differs depending on lamp manufacturers. In this conventional liquid crystal display device, as shown in FIG. 1, the ineffective light emitting portions 27b are mostly covered with the side reflector 24 and the lamp support bases 26.

In the conventional liquid crystal display device, a picture frame area 34 which does not display images is formed around a display area 33 which displays images through the liquid crystal panel 22. The picture frame area 34 is defined by the ineffective light emitting portions 27b, lamp support bases 26, return substrate 28, gap 31, and frame 21 with an insulating sheet 32 affixed to the inner surface thereof.

Recently, for the liquid crystal display device there has been a request for a decrease of its size and an increase in size of the display area. To meet this request it is required to form the picture frame area as narrow as possible. In the conventional liquid crystal display device, however, as shown in FIG. 1, the ineffective light emitting portions 27b are present at both ends of each lamp 27, and between the lamps 27 and the frame 21 there are provided lamp support bases 26, return substrate 28 and gap 31, further, the insulating sheet 32 is affixed to the inner surface of the frame 21. Thus, a limit is encountered in narrowing the picture frame.

FIG. 2 is a partial sectional view showing the construction of another conventional liquid crystal display device. In the liquid crystal display device shown in FIG. 2, the length of each lamp 27 is set shorter than the liquid crystal panel 22 in order to make the picture frame area 34 as narrow as possible. Further, the chassis 23, side reflector 24 and lamp support bases 26 used in the liquid crystal display device of FIG. 1 are rendered integral and replaced by a chassis with reflector 36. The other construction of the conventional liquid crystal display device shown in FIG. 2 is the same as that of the liquid crystal display device shown in FIG. 1.

However, this conventional liquid crystal display device shown in FIG. 2 involves the following problems. In the liquid crystal display device, the length of each lamp 27 is set shorter than the liquid crystal panel 22 in order to make the picture frame area 34 as narrow as possible. As a result, although the picture frame area 34 of the liquid crystal display device shown in FIG. 2 is narrower than that of the liquid crystal display device shown in FIG. 1, the ineffective light emitting portions 27b of each lamp 27 are not wholly covered with the chassis with reflector 36 and protrude between the chassis with reflector 36. In FIG. 2, the length of each ineffective light emitting portion 27b thus protruding between the chassis with reflector 36 is assumed to be A. As a result, when displaying an image in the display area 33, the effective light emitting portion 27c of each lamp 27 becomes farther from the chassis with reflector 36 by the length A, thus giving rise to the problem that side portions of the display area 33 become dark.

Moreover, in the conventional liquid crystal display devices shown in FIGS. 1 and 2, the surface 28a of the return substrate 28 is perpendicular to the display surface of the liquid crystal panel 22, so when assembling the liquid crystal display device, the solder 28b is applied to the return substrate surface 28a while erecting the structure comprising the lamps 27, lamp support bases 26 and side reflector 24 so that the axes of the lamps 27 become vertical. Thus, not only the assembling work becomes difficult and the working efficiency lowers but also the assembling work becomes more dangerous.

SUMMARY OF THE INVENTION

It is an object of the present invention to provide a liquid crystal display device narrow in a picture frame area, superior in luminance uniformity in a display area and easy to effect the assembling work.

The liquid crystal display device according to the present invention is provided with a liquid crystal panel, a backlight section, and a frame for holding the liquid crystal panel and the backlight section. The backlight section comprises plural cold-cathode discharge tubes, lead wires, the lead wires being drawn out respectively from one end faces of the cold-cathode discharge tubes in a direction intersecting the longitudinal direction of the tubes directly or after once drawn out longitudinally of the tubes, and a return substrate which interconnects the lead wires. The return substrate is disposed at a position deviated from prolonged lines in the longitudinal direction of the cold-cathode discharge tubes.

Thus, in the present invention, lead wires are drawn out in a direction intersecting the longitudinal direction of the cold-cathode discharge tubes from one end faces of the tubes and the return substrate is disposed at a position deviated from longitudinally prolonged lines of the cold-cathode discharge tubes. Therefore, a picture frame area can be made narrower by an amount corresponding to the return substrate. Besides, since the return substrate is not disposed on longitudinally prolonged lines of the cold-cathode discharge tubes, the gap for preventing contact of the return substrate with a frame, as well as the insulating sheet, are no longer required, whereby the picture frame area can be made still narrower.

Moreover, since it is possible to use longer cold-cathode discharge tubes than in the prior art relative to the size of the liquid crystal display device, the length of an effective light emitting portion of each cold-cathode discharge tube can be increased. Consequently, an ineffective light emitting portion in each cold-cathode discharge tube can be positioned between a side reflector and a frame, whereby the luminance uniformity in a display area of the liquid crystal panel can be improved.

Further, a solder-forming surface of the return substrate can be made parallel to the longitudinal direction of the cold-cathode discharge tubes, whereby lead wires can be soldered to the return substrate while allowing the cold-cathode discharge tubes to lie down in the liquid crystal display device assembling work. As a result, it is possible to improve the liquid crystal display device assembling work.

The lead wires may be once drawn out longitudinally of the cold-cathode discharge tubes from one end faces of the tubes and thereafter bent toward the liquid crystal panel. In this connection, the backlight section has a bottom reflector which is opposed to the liquid crystal panel with the cold-cathode discharge tubes therebetween and a side reflector which is disposed along a side edge of the bottom reflector. The return substrate may be disposed between the side reflector and the frame.

The lead wires may be once drawn out longitudinally of the cold-cathode discharge tubes from one end faces of the tubes and thereafter bent toward the side opposite to the liquid crystal panel. In this connection, the backlight section may have support bases for holding one ends of the cold-cathode discharge tubes and the return substrate may be mounted to the support bases. According to this construction, the return substrate can be supported by the support bases and it is not necessary to provide any special member for supporting the return substrate.

The cold-cathode discharge tubes may be provided outside the one ends thereof with electrodes respectively and the lead wires may be connected respectively to the electrodes and extend in a direction intersecting the longitudinal direction of the cold-cathode discharge tubes. Thus, it is possible to prevent imposing a burden by bending the lead wires on the lead wires. The return substrate may be an insulating board with wiring patterns formed thereon. The return substrate may be in the shape of a plate, rod, or cable, formed of a metal or an alloy. Thus, the return substrate can be formed in any desired shape. As a result, the return substrate can be buried smoothly into a gap between constituent elements of the liquid crystal display device or fitted and fixed into such constituent elements.

The bottom reflector may be a metallic plate or a white resin plate, or a metallic or resin plate with a reflector clad to a surface thereof. In the present invention, by the word "metal" is meant to include both metal and alloy. The reflector as referred to herein indicates a reflecting sheet or the like formed by a film of resin, paper, or vinyl. The clad or cladding indicates coating or sticking.

Thus, according to the present invention it is possible to obtain a liquid crystal display device narrow in the picture frame area, superior in luminance uniformity in the display area and easy to effect the assembling work.

DETAILED DESCRIPTION OF THE PREFERRED EMBODIMENTS

Figure 3:
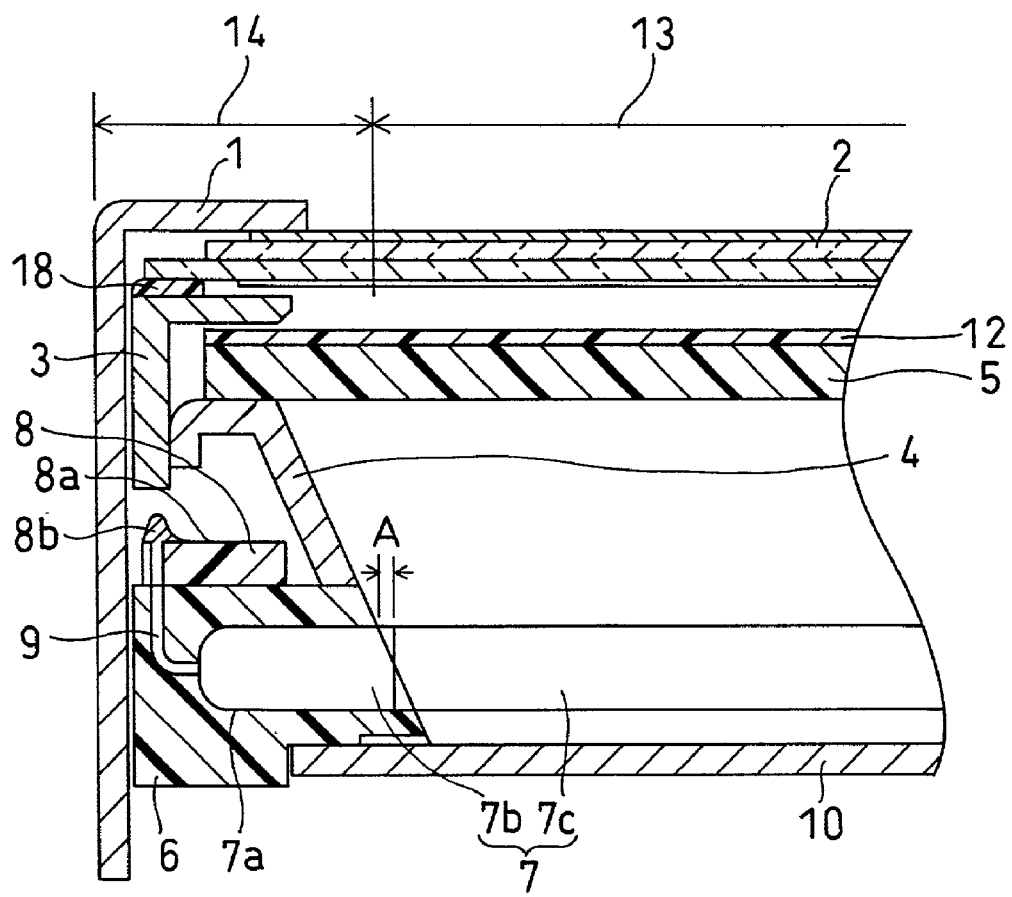
FIG. 3 is a partial sectional view showing the construction of a liquid crystal display device according to a first embodiment of the present invention.
Figure 4:
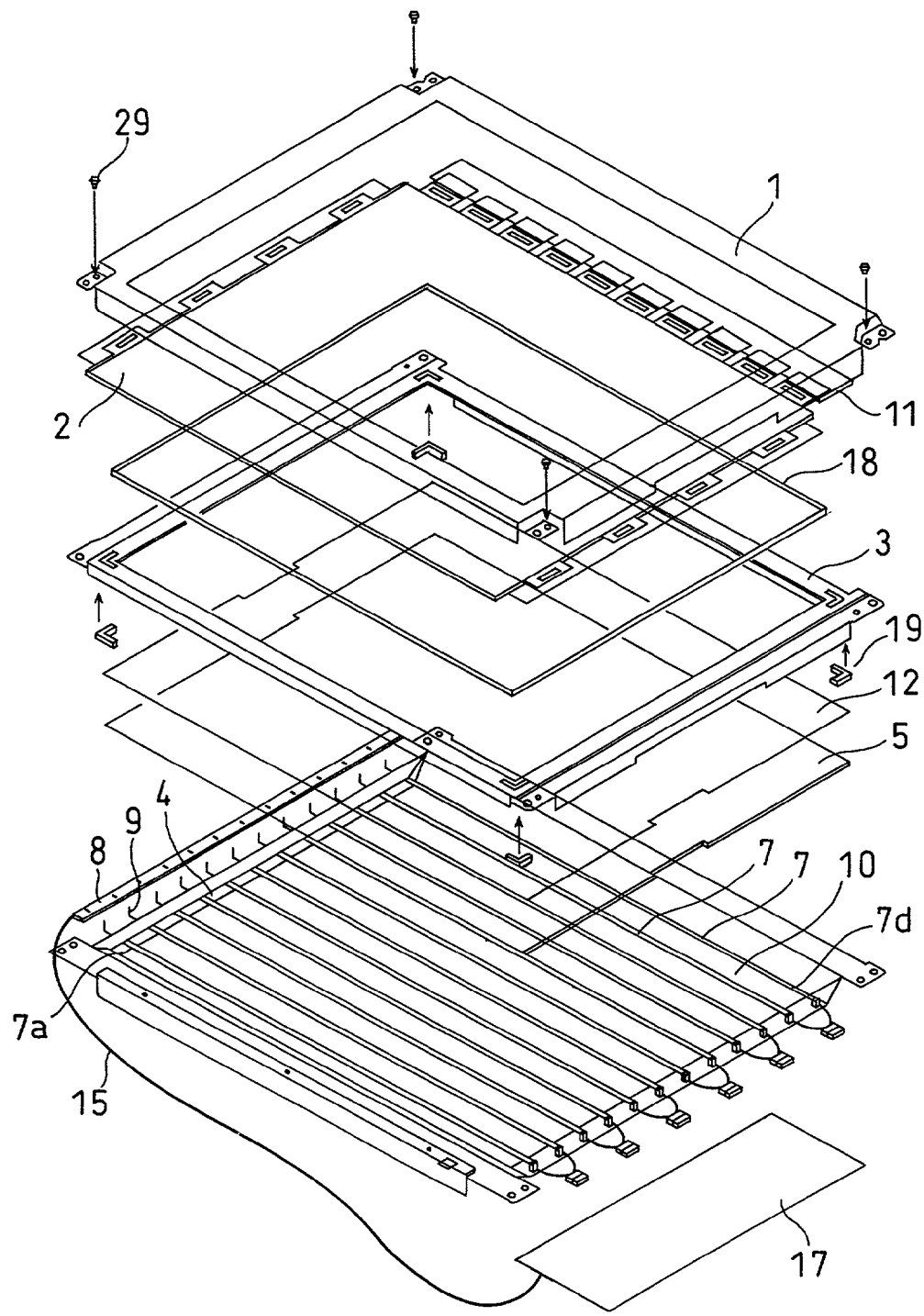
FIG. 4 is an exploded assembly diagram showing the construction of the liquid crystal display device of the first embodiment.

Embodiments of the present invention will be described concretely with reference to the accompanying drawings. A first embodiment of the invention will now be described. FIG. 3 is a partial sectional view showing the construction of a liquid crystal display device according to the first embodiment and FIG. 4 is an exploded assembly diagram showing the construction of this liquid crystal display device. In the liquid crystal display device of this embodiment, as shown in FIGS. 3 and 4, a liquid crystal panel 2 for the display of image is provided and there also is provided a frame 1 of an L-shaped section, the frame 1 supporting the liquid crystal panel 2 while covering side portions of a surface of the liquid crystal panel and constituting side portions of the whole of the liquid crystal display device. A connecting substrate 11 (see FIG. 4) for driving the liquid crystal panel 2 is attached to the same panel. The connecting substrate 11 is bent at approximately right angles from the liquid crystal-panel 2 and is received inside the frame 1.

A frame-like cushion 18 (see FIG. 4) is connected to the liquid crystal panel 2 and a chassis 3 is connected to an inner surface of the frame 1 and also to the cushion 18. The cushion 18 is for preventing a glass substrate of the liquid crystal panel 2 from being damaged by contact thereof with the chassis 3. A side reflector 4 is connected to one side of the chassis 3 and fixing members 19 are provided respectively at four corners of the chassis 3 on the side where the side reflector 4 is provided. An optical sheet 12 for condensing transmitted light and a diffuser 5 for diffusing transmitted light are disposed between the chassis 3 and the side reflector 4. Side portions of the optical sheet 12 and the diffuser 5 are supported by the chassis 3, side reflector 4 and fixing members 19. The optical sheet 12 and the diffuser 5 are translucent white sheets formed of acrylic resin for example and are superimposed one on the other in parallel with the liquid crystal panel 2. The optical sheet 12 is positioned closer to the liquid crystal panel 2 with respect to the diffuser 5.

The side reflector 4 is provided with plural lamp support bases 6 which are arranged in a row in a direction parallel to a surface of the liquid crystal panel 2. Each lamp support base 6 holds a low pressure-side end portion 7a of a lamp 7 which is a cold-cathode discharge tube. Plural lamps 7 are provided and are arranged in parallel. A return substrate 8 which extends in the arranged direction of the lamps 7 is attached to the lamp support bases 6 on the side opposed to the liquid crystal panel 2. The return substrate 8 comprises an insulating substrate and wiring patterns formed thereon. But the return substrate 8 is not what is called a circuit substrate with such components as transistors printed thereon. Lead wires 9 once extend axially of the lamps 7 from the low pressure-side end portions 7a, then are bent toward the return substrate 8, pass through the lamp support bases 6, reach the return substrate 8, and are connected to solder 8b formed on a surface 8a of the return substrate 8 which surface is opposed to the liquid crystal panel 2. Thus, the low pressure-side end portions 7a of the lamps 7 are interconnected through the return substrate 8.

Ineffective light emitting portions 7b are provided respectively at both end portions of each lamp 7 which is a cold-cathode discharge tube. The portion between the ineffective light emitting portions 7b at both ends is an effective light emitting portion 7c. The ineffective light emitting portions 7b of each lamp 7 are portions of a cold-cathode discharge tube within which are disposed electrodes. The ineffective light emitting portions 7b, located on the side reflector 4 side, are hidden outside the side reflector 4. In the liquid crystal display device of this embodiment, a picture frame area 14 which does not display images is formed around a display area 13 which displays images through the liquid crystal panel 2 on an image display surface of the liquid crystal display device, and the ineffective light emitting portions 7b of the lamps 7 and the lamp support bases 6 are positioned in the picture frame area 14. A bottom reflector 10 is disposed on the side opposite to the liquid crystal panel 2 when looking from the lamps 7 side. The bottom reflector 10, which reflects light from the lamps 7 toward the liquid crystal panel 2, is formed by a metallic member of a high light reflectance or by coating or sticking a reflecting material such as a white resin onto a metal such as aluminum or aluminum alloy. A surface of a central portion and the vicinity thereof of the bottom plate 10 is parallel to the axial direction of the lamps 7 and also to surfaces of the diffuser 5, optical sheet 12 and liquid crystal panel 2. Of side portions of the bottom reflector 10, three side portions not in contact with the side reflector 4 are bent obliquely to surround the lamps 7 together with the side reflector 4.

As shown in FIG. 4, a cable 15 is connected at one end thereof to the return substrate 8 and is also connected at an opposite end thereof to an inverter substrate 17, which in turn is connected to high pressure-side electrode portions (not shown) located on high pressure-side end portions 7d of the lamps 7. The bottom reflector 10 is fixed to the frame 1 with screws 29, whereby the frame 1, liquid crystal panel 2, chassis 3, side reflector 4, optical sheet 12, diffuser 5, lamps 7, lamp support bases 6, bottom reflector 10, cable 15, and inverter substrate 17 are assembled integrally to constitute the liquid crystal display device.

The operation of the liquid crystal display device of this embodiment will now be described. When a voltage of say 10 to 24V is supplied to the inverter substrate 17 from an external power supply (not shown), the inverter substrate 17 steps up this voltage to say 500 to 1000V and supplies it to the high pressure-side electrode portions disposed at the high pressure-side end portions 7d of the lamps 7, so that the lamps 7 emit light. The light emitted from the lamps 7 travels toward the diffuser 5 directly or after being reflected by the bottom reflector 10 or the side reflector 4, then passes through the diffuser 5 and is thereby diffused, then passes through the optical sheet 12 and is condensed thereby, which condensed light is fed to the liquid crystal panel 2. The liquid crystal panel 2, which is driven by the connecting plate 11, allows the light fed from the optical sheet 12 to pass therethrough selectively and is colored to form an image in the display area 13 of the liquid crystal panel 2.

Figure 1:
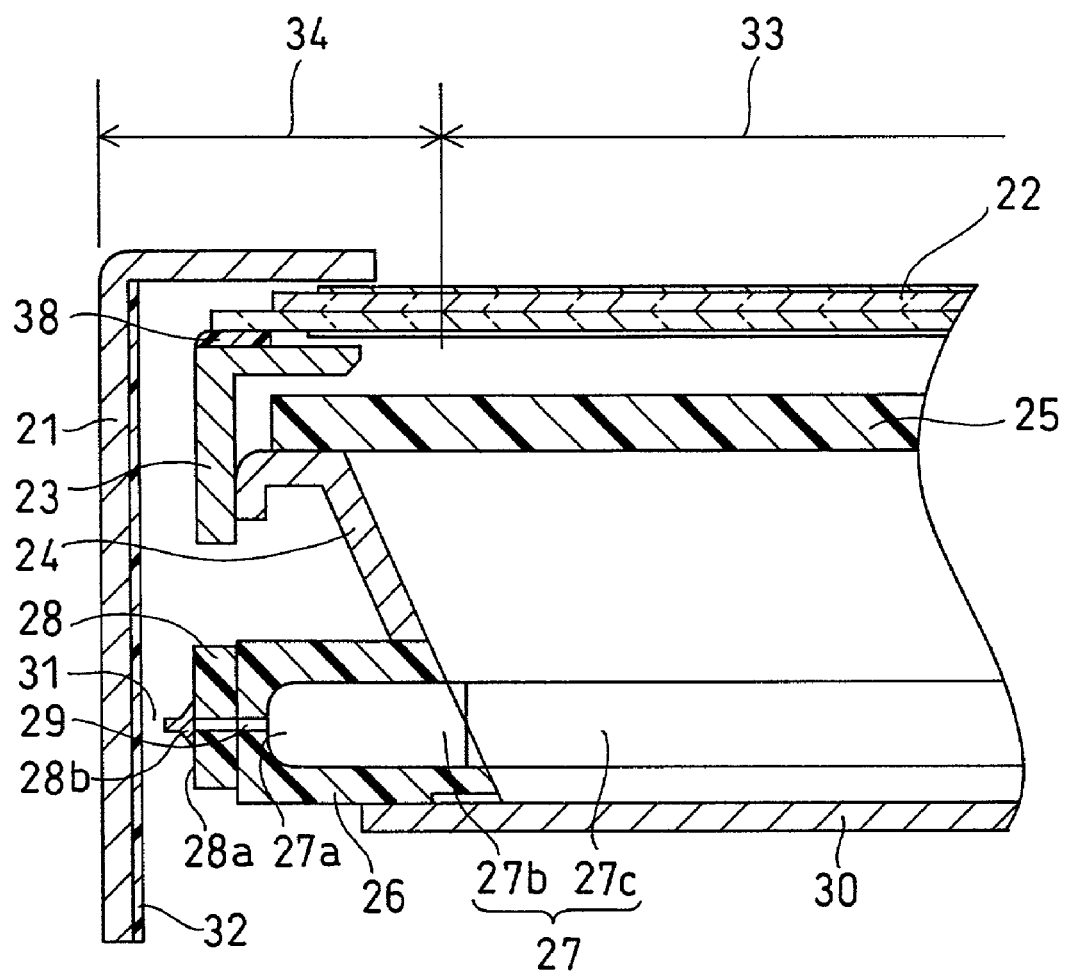
FIG. 1 is a partial sectional view showing the construction of a conventional liquid crystal display device.

In the liquid crystal display device of this embodiment, the lead wires 9 are drawn out from the low pressure-side end portions 7a of the lamps 7 toward the liquid crystal panel 2 and the return substrate 8 is disposed on the lamp support bases 6 on the side opposed to the liquid crystal panel 2. Therefore, in the liquid crystal display device of this embodiment, unlike the conventional liquid crystal display device, there is neither return substrate nor insulating sheet (see FIG. 1) between the lamp support bases 6 and the frame 1. As a result, in the liquid crystal display device of this embodiment, the picture frame area 14 can be narrowed by an amount corresponding to the return substrate 28 and the insulating sheet 32 (see FIG. 1) in comparison with the conventional liquid crystal display device, as is seen from a comparison between the picture frame area 34 in the conventional liquid crystal display device shown in FIG. 1 and the picture frame area 14 in the liquid crystal display device of this embodiment shown in FIG. 3. In this embodiment the picture frame area 14 can be made narrower by say 2 mm or so than in the conventional liquid crystal display device. At present, in liquid crystal display devices, the reduction of size and an increase of the screen size are very important subjects to be attained. That the picture frame area 14 can be made narrower by about 2 mm than in the prior art, therefore, is an extremely outstanding effect.

Figure 2:
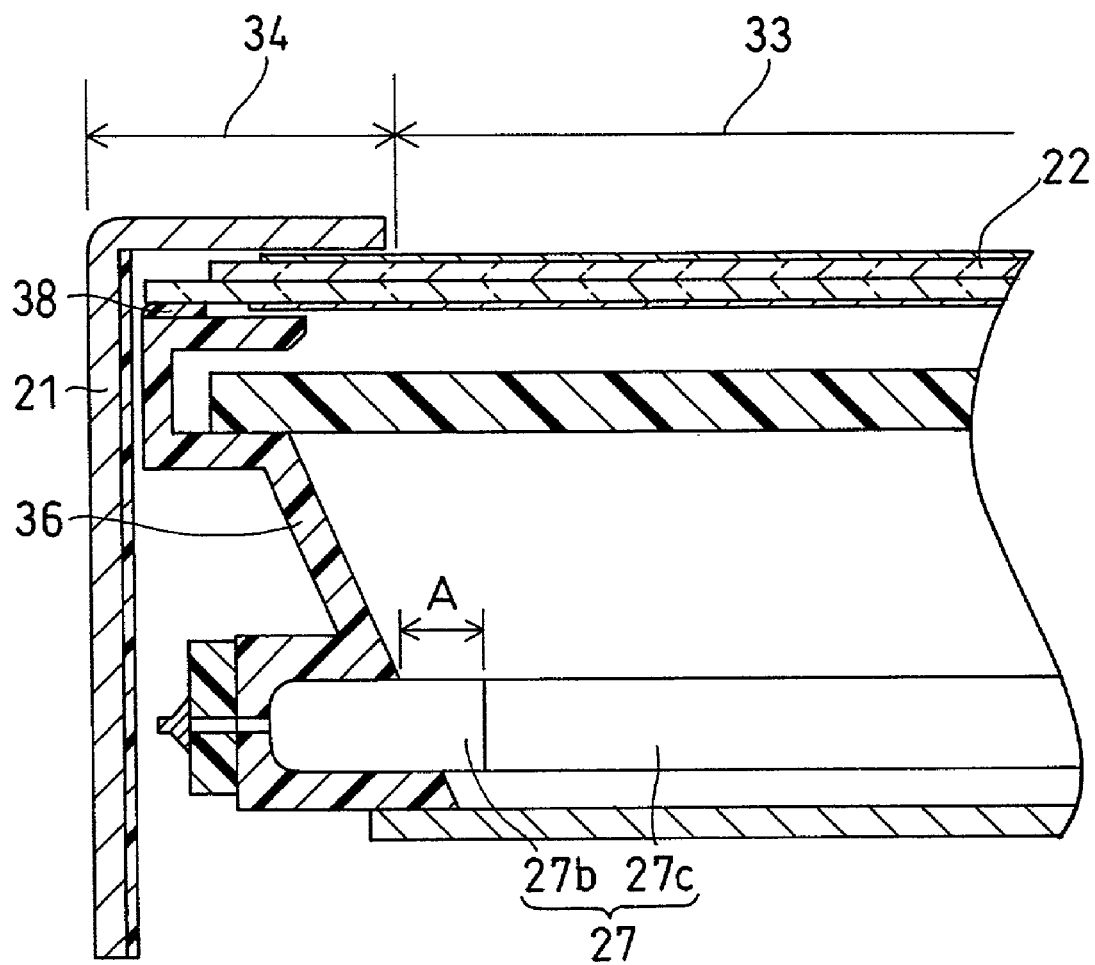
FIG. 2 is a partial sectional view showing the construction of another conventional liquid crystal display device.

Besides, unlike the conventional liquid crystal display device shown in FIG. 2, it is not necessary that the lamps 7 be shortened for narrowing the picture frame area 14. Consequently, as is seen from a comparison between the length A in the conventional liquid crystal display device shown in FIG. 2 and the length A in the liquid crystal display device of this embodiment shown in FIG. 3, the ineffective light emitting portions 7b of the lamps 7 can mostly be covered with the side reflector 4, whereby the luminance of the liquid crystal panel 2 can be kept uniform.

Alternatively, the lamps 7 can be made longer than in the conventional liquid crystal display device while setting the width of the picture frame area 14 at about the same as the width of the picture frame area in the conventional liquid crystal display device. By so doing, the ineffective light emitting portions 7b of the lamps 7 can be covered completely with the side reflector 4. That is, the length A shown in FIG. 3 can be set zero. As a result, the luminance of the liquid crystal panel 2 can be made more uniform. Thus, in this embodiment, both narrowing the picture frame and uniforming the luminance can be attained at a higher level.

In this embodiment, moreover, the solder-forming surface 8a of the return substrate 8 is parallel to the bottom reflector 10. Therefore, when assembling the liquid crystal display device, the liquid crystal display device can be placed on a working table so that the bottom reflector 10 becomes parallel to an upper surface of the working table, and in this state soldering can be performed. Consequently, not only the assembling work becomes easier and the working efficiency is improved but also there is attained an improvement of safety.

The lamp support bases 6 may be brought into contact with the inner surface of the frame 1, whereby not only it is possible to eliminate the gap between the lamp support bases 6 and the frame 1 and make the picture frame area 14 narrower but also it is possible to improve the rigidity of the entire liquid crystal display device. The bottom reflector 10 used in this embodiment is formed by a metallic member of a high light reflectance or is formed by coating a white resin onto a metallic plate such as an aluminum or aluminum alloy plate. However, this constitutes no limitation in the present invention. For example, the bottom reflector may be formed by a white resin or by a metallic plate of, for example, a mirror surface having a high reflectance. A reflecting material of a high reflectance such as a film of paper or vinyl may be formed on an inside (a reflecting surface side) of the bottom reflector by coating or sticking. Further, although the return substrate 8 used in this embodiment is formed by forming wiring patterns on an insulating substrate, the return substrate is not limited to this structure. For example, the return substrate may be in the shape of a plate, rod, or cable, formed of a metal or an alloy.

Figure 5:
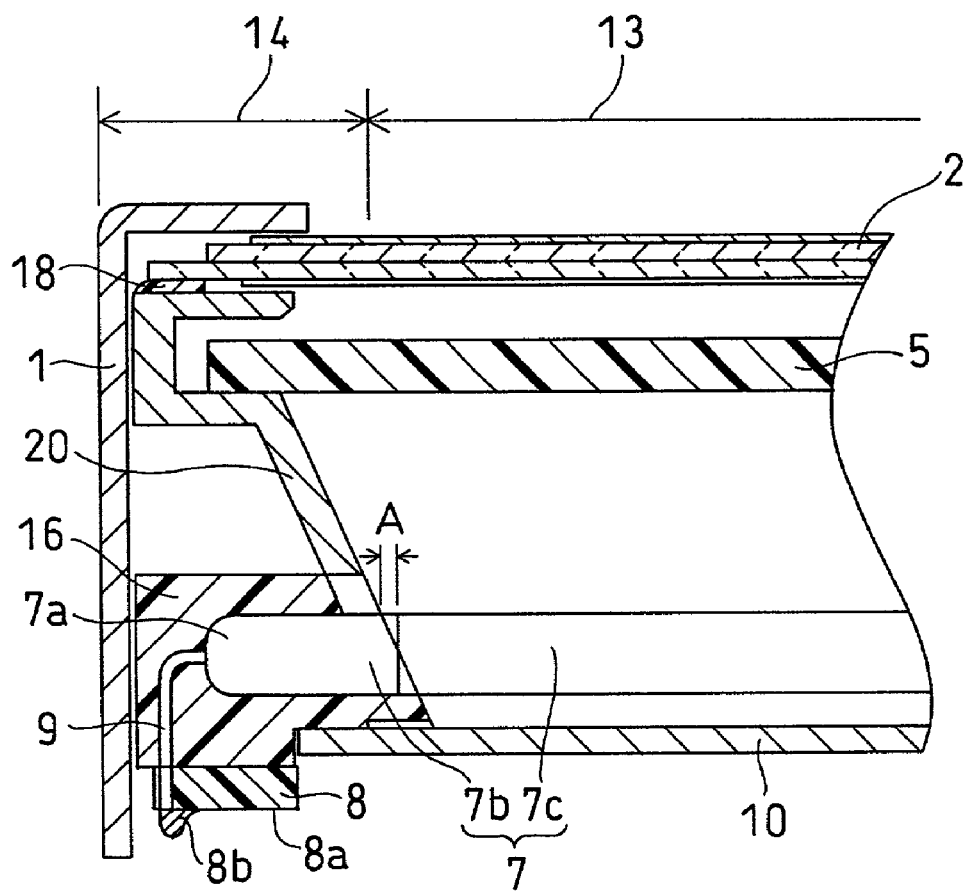
FIG. 5 is a partial sectional view showing the construction of a liquid crystal display device according to second embodiment of the present invention.

Next, a second embodiment of the present invention will be described. FIG. 5 is a partial sectional view showing the construction of a liquid crystal display device according to a second embodiment of the present invention. In the liquid crystal display device of this embodiment there are provided lamp support bases 16 which support low pressure-side end portions 7a of lamps 7, and lead wires 9 once extend in the longitudinal direction of the lamps 7 from the low pressure-side end portions 7a of the lamps 7 and are then drawn out in a direction away from the liquid crystal panel 2. A return substrate 8 is attached to the lamp support bases 16 on the side remoter from the liquid crystal panel 2. The lead wires 9 drawn out from the low pressure-side end portions 7a of the lamps 7 pass through the interiors of lamp support bases 16 and are connected to solder 8b formed on a surface 8a of the return substrate 8. In the liquid crystal display device of this embodiment, a chassis with reflector 20, which has an integrated shape of both chassis 3 and side reflector 4 used in the previous first embodiment, is provided instead of the chassis 3 and the side reflector 4. Further, in the liquid crystal display device of this embodiment the use of an optical sheet is omitted. Other constructional and operational points in the liquid crystal display device of this embodiment are the same as in the liquid crystal display device of the first embodiment.

Also in the liquid crystal display device of this embodiment there are obtained the same effects as in the previous first embodiment. That is, the picture frame area 14 in the liquid crystal display device of this embodiment can be made narrower by an amount corresponding to the return substrate 28 and the insulating sheet 32 (see FIG. 1) which are used in the conventional liquid crystal display device, as is seen from a comparison between the picture frame area 34 in the conventional liquid crystal display devices shown in FIG. 1 and the picture frame area 14 in the liquid crystal display device of this embodiment shown in FIG. 5. Besides, since the ineffective light emitting portions 7b of the lamps 7 can be mostly covered with the chassis with reflector 20, it is possible to ensure a uniform luminance of the liquid crystal panel 2, as is seen from a comparison between the length A in the conventional liquid crystal display device of FIG. 2 and the length A in the liquid crystal display device of this embodiment shown in FIG. 5.

This embodiment further brings about the following effects in addition to the above effects. Since the solder 8b on the return substrate 8 is exposed to the back side of the liquid crystal display device, i.e., the side where the liquid crystal panel 2 is not provided, soldering can be effected even after the liquid crystal panel 2, diffuser 5, chassis with reflector 20, lamp support bases 16, lamps 7 and bottom reflector 10 are rendered integral by the frame 1. Consequently, the working efficiency in assembling the liquid crystal display device is further improved. Moreover, since the functions of the chassis 3 and the side reflector 4 (see FIG. 3) both used in the first embodiment are taken charge of by the chassis with reflector 20, it is possible to reduce the number of components used in comparison with the first embodiment.

Although in this embodiment the return substrate 8 is attached to the lamp support bases 16, it may be mounted to the bottom reflector 10 on the side where the lamps 7 are not disposed.

Figure 6:
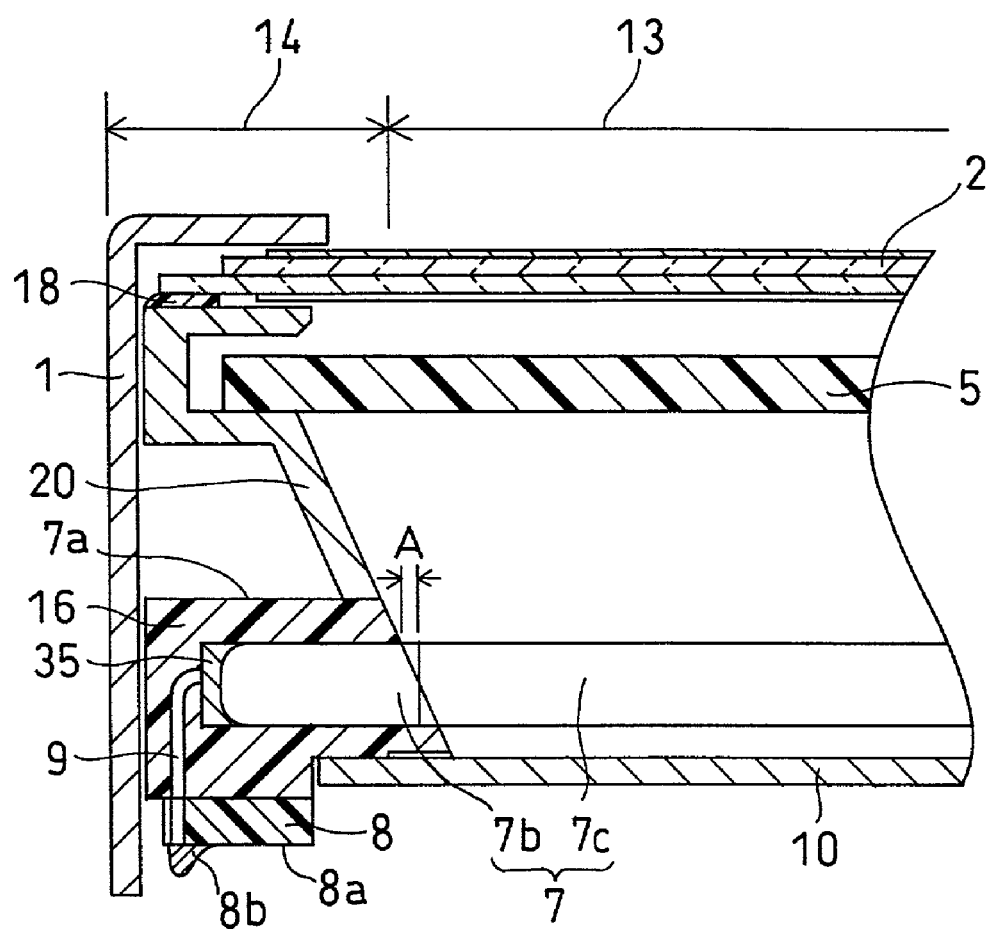
FIG. 6 is a partial sectional view showing the construction of a liquid crystal display device according to a modification of the second embodiment.

A modification of this embodiment will now be described. FIG. 6 is a partial sectional view showing the construction of a liquid crystal display device according to this modification. In this modification, metallic external electrodes 35 are formed at the low pressure-side end portions 7a of lamps 7 and lead wires 9 are drawn out from the external electrodes 35 toward the return substrate 8. Other constructional and operational points of the liquid crystal display device according to this modification are the same as those of the liquid crystal display device of the previous second embodiment. In the previous first and second embodiments the lead wires 9 are once extended axially of the lamps 7 from the low pressure-side end portions 7a of the lamps 7 and are then bent toward the return substrate 8, so that a certain burden is imposed on the lead wires 9. On the other hand, in this modification, such a burden can be eliminated because the external electrodes 35 are provided. Consequently, it is possible to improve the reliability of the liquid crystal display device.

What is claimed is:

1. A liquid crystal display device comprising:
    a liquid crystal panel;
    a backlight section, said backlight section comprising:
        a plurality of cold-cathode discharge tubes;
        lead wires drawn out from one end of each of said cold-cathode discharge tubes in a direction intersecting the longitudinal direction of said tubes directly or after the lead wires extend longitudinally from the tubes; and
        a return substrate which interconnects said lead wires and which is disposed at a position such that said substrate is either directly above or below a portion of said cold-cathode discharge tubes; and
    a frame for holding said liquid crystal panel and said backlight section,
    wherein said lead wires are bent toward said liquid crystal panel after once drawn out in the longitudinal direction of said cold-cathode discharge tubes from the one end faces of the tubes.

2. A liquid crystal display device according to claim 1, wherein said return substrate is formed by forming wiring patterns on an insulating substrate, or is in the shape of a plate, rod, or cable, formed of a metal or an alloy.

3. A liquid crystal display device according to claim 1, wherein said backlight section further comprises:
    a bottom reflector which is opposed to said liquid crystal panel wit said cold-cathode discharge tubes therebetween; and
    a side reflector disposed at a side edge of said bottom reflector.

4. A liquid crystal display device according to claim 3, wherein said return substrate is disposed between said side reflector and said frame.

5. A liquid crystal display device according to claim 3, wherein said cold-cathode discharge tubes each comprise:
    ineffective light emitting portions formed respectively at both longitudinal ends and positioned between said side reflector and said frame; and
    an effective light emitting portion positioned between both said ineffective light emitting portions.

6. A liquid crystal display device according to claim 3, wherein said bottom reflector is constituted by a metallic plate or a white resin plate, or a metallic or resin plate whose surface is clad with a reflecting material.

7. A liquid crystal display device according to claim 1, wherein said backlight section further comprises support bases for holding one end portions of said cold-cathode discharge tubes, and said return substrate is mounted to said support bases.

8. A liquid crystal display device according to claim 1, wherein said cold-cathode discharge tubes are provided outside the one end faces thereof with electrodes respectively, and said lead wires are connected respectively to said electrodes and extend in a direction intersecting the longitudinal direction of the cold-cathode discharge tubes.

9. A liquid crystal display device comprising:
    a liquid crystal panel;
    a backlight section, said backlight section comprising:
        a plurality of cold-cathode discharge tubes;
        lead wires drawn out from one end of each of said cold-cathode discharge tubes in a direction intersecting the longitudinal direction of said tubes directly or after the lead wires extend longitudinally from the tubes; and
        a return substrate which interconnects said lead wires and which is disposed at a position such that said substrate is either directly above or below a portion of said cold-cathode discharge tubes; and
    a frame for holding said liquid crystal panel and said backlight section,
    wherein said lead wires are bent toward the side opposite to said liquid crystal panel after once drawn out in the longitudinal direction of said cold-cathode discharge tubes from the one end faces of the tubes.

10. A liquid crystal display device according to claim 9, wherein said return substrate is formed by forming wiring patterns on an insulating substrate, or is in the shape of a plate, rod, or cable, formed of a metal or an alloy.

11. A liquid crystal display device according to claim 9, wherein said backlight section further comprises:
    a bottom reflector which is opposed to said liquid crystal panel with said cold-cathode discharge tubes therebetween; and
    a side reflector disposed at a side edge of said bottom reflector.

12. A liquid crystal display device according to claim 11, wherein said return substrate is disposed between said side reflector and said frame.

13. A liquid crystal display device according to claim 11, wherein said cold-cathode discharge tubes each comprise:
    ineffective light emitting portions formed respectively at both longitudinal ends and positioned between said side reflector and said frame; and
    an effective light emitting portion positioned between both said ineffective light emitting portions.

14. A liquid crystal display device according to claim 11, wherein said bottom reflector is constituted by a metallic plate or a white resin plate, or a metallic or resin plate whose surface is clad with a reflecting material.

15. A liquid crystal display device according to claim 9, wherein said backlight section further comprises support bases for holding one end portions of said cold-cathode discharge tubes, and said return substrate is mounted to said support bases.

16. A liquid crystal display device according to claim 9, wherein said cold-cathode discharge tubes are provided outside the one end faces thereof with electrodes respectively, and said lead wires are connected respectively to said electrodes and extend in a direction intersecting the longitudinal direction of the cold-cathode discharge tubes.

* * * * *